US011854475B2

(12) United States Patent
Chun

(10) Patent No.: US 11,854,475 B2
(45) Date of Patent: Dec. 26, 2023

(54) DISPLAY DEVICE

(71) Applicant: LG ELECTRONICS INC., Seoul (KR)

(72) Inventor: Youngho Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/711,404

(22) Filed: Apr. 1, 2022

(65) Prior Publication Data

US 2022/0262305 A1 Aug. 18, 2022

Related U.S. Application Data

(63) Continuation of application No. 17/206,848, filed on Mar. 19, 2021, now Pat. No. 11,322,077.

(30) Foreign Application Priority Data

Feb. 16, 2021 (KR) ........................ 10-2021-0020265

(51) Int. Cl.
*G09G 3/36* (2006.01)
*G09G 3/20* (2006.01)
(Continued)

(52) U.S. Cl.
CPC ... *G09G 3/3208* (2013.01); *G09G 2320/0233* (2013.01); *G09G 2320/0238* (2013.01);
(Continued)

(58) Field of Classification Search
CPC .......... G09G 3/3208; G09G 2320/0233–0276; G09G 2320/0673–0686; G09G 2320/10
See application file for complete search history.

(56) References Cited

U.S. PATENT DOCUMENTS 7,106,350 B2 * 9/2006 Baba .................... G09G 3/3614 345/691
8,547,315 B2 10/2013 Doi et al.
(Continued)

FOREIGN PATENT DOCUMENTS

CN 101206841 6/2008
CN 103137084 A * 6/2016 ........... G09G 3/3406
(Continued)

OTHER PUBLICATIONS

PCT International Application No. PCT/KR2021/002352, International Search Report dated May 3, 2022, 3 pages.
(Continued)

*Primary Examiner* — Lin Li
(74) *Attorney, Agent, or Firm* — LEE, HONG, DEGERMAN, KANG & WAIMEY PC

(57) ABSTRACT

Disclosed herein is a display device for preventing a luminance floatation phenomenon in a low grayscale region. The display device includes a display panel, an external input interface configured to receive an image signal from an external device, and a controller configured to adjust a gamma value when an input frequency of the image signal is less than an output frequency of the display panel and a variable refresh rate (VRR) function for changing the output frequency according to the input frequency is activated and to output the image signal to the display panel based on the adjusted gamma value.

15 Claims, 14 Drawing Sheets

(51) Int. Cl.

*G09G 3/34* (2006.01)
*H04N 5/14* (2006.01)
*G09G 3/3208* (2016.01)

(52) U.S. Cl.

CPC ............... *G09G 2320/0276* (2013.01); *G09G 2320/0673* (2013.01); *G09G 2320/0686* (2013.01); *G09G 2320/10* (2013.01)

(56) References Cited

U.S. PATENT DOCUMENTS

| | | | | |
|---|---|---|---|---|
| 9,847,056 | B2 | 12/2017 | Shimizu et al. | |
| 10,810,930 | B2 | 10/2020 | Shim et al. | |
| 2006/0164356 | A1* | 7/2006 | Yang | G09G 3/3611 345/89 |
| 2007/0097107 | A1 | 5/2007 | Furukoshi | |
| 2009/0147032 | A1 | 6/2009 | Kim | |
| 2011/0025726 | A1* | 2/2011 | Tatsumi | G09G 3/2025 345/690 |
| 2016/0093248 | A1 | 3/2016 | Shimizu et al. | |
| 2016/0104408 | A1 | 4/2016 | Kim et al. | |
| 2017/0221404 | A1* | 8/2017 | Park | G09G 3/3406 |
| 2018/0048853 | A1* | 2/2018 | Koh | G09G 3/3688 |
| 2020/0219432 | A1* | 7/2020 | Park | G09G 3/2003 |
| 2021/0118354 | A1* | 4/2021 | Ahn | G09G 3/2074 |
| 2021/0272495 | A1* | 9/2021 | Park | H04N 5/14 |
| 2022/0189430 | A1* | 6/2022 | Kim | G09G 3/3685 |

FOREIGN PATENT DOCUMENTS

| | | | | |
|---|---|---|---|---|
| CN | 101206841 A | * | 6/2018 | G09G 3/3696 |
| CN | 112562597 A | * | 2/2021 | G09G 3/3406 |
| CN | 112562597 A | * | 3/2021 | G09G 3/3406 |
| JP | 2006330292 | | 12/2006 | |
| JP | 2009058675 | | 3/2009 | |
| KR | 1020150121141 | | 10/2015 | |
| KR | 1020160044166 | | 4/2016 | |
| KR | 1020180059017 | | 6/2018 | |

OTHER PUBLICATIONS

Korean Intellectual Property Office Application No. 10-2021-0020265, Office Action dated Sep. 7, 2022, 7 pages.

U.S. Appl. No. 17/206,848, Notice of Allowance dated Jan. 11, 2022, 13 pages.

* cited by examiner

| Input frequency (Driving frequency), Hz | 25 | 50 | 60 | 100 | 120 |
|---|---|---|---|---|---|
| Prior art - Luminance(nit) 10 gray level / 255 gray level | 0.35 | 0.3 | 0.29 | 0.27 | 0.25 |
| Present disclosure - Luminance(nit) 10 gray level / 255 gray level | 0.25 | 0.25 | 0.25 | 0.25 | 0.25 |
| Luminance difference | 0.1 | 0.05 | 0.04 | 0.02 | 0 |

| Input frequency (Driving frequency), Hz | 25 | 50 | 60 | 100 | 120 |
|---|---|---|---|---|---|
| Prior art - Luminance(nit) 20 gray level / 255 gray level | 0.82 | 0.72 | 0.71 | 0.69 | 0.67 |
| Present disclosure - Luminance(nit) 20 gray level / 255 gray level | 0.67 | 0.67 | 0.67 | 0.67 | 0.67 |
| Luminance difference | 0.15 | 0.05 | 0.04 | 0.02 | 0 |

1700

Output frequency of display panel – 120Hz, VRR ON

| Input frequency (Driving frequency), Hz | 25 | 50 | 60 | 100 | 120 |
|---|---|---|---|---|---|
| Prior art - Gamma value | 1.9 | 2.0 | 2.1 | 2.2 | 2.3 |
| Present disclosure - Gamma value for low grayscale region | 2.0 | 2.1 | 2.2 | 2.3 | 2.3 |

DISPLAY DEVICE

CROSS-REFERENCE TO RELATED APPLICATIONS

This application is a continuation of U.S. patent application Ser. No. 17/206,848, filed on Mar. 19, 2021, which claims the benefit of earlier filing date and right of priority to Korean Patent Application No. 10-2021-0020265, filed on Feb. 16, 2021, the contents of which are all incorporated by reference herein in their entirety.

BACKGROUND

1. Field

The present disclosure relates to a display device, and more particularly, to an organic light emitting diode display device.

2. Description of the Related Art

Recently, various types of display devices have been provided. Among them, an Organic Light Emitting Diode display device (hereinafter referred to as "OLED display device") is frequently used.

The OLED display device is a display device using organic light emitting elements. Since the organic light emitting elements are self-light-emitting elements, the OLED display device has advantages of being fabricated to have lower power consumption and be thinner than a liquid crystal display device requiring a backlight. In addition, the OLED display device has advantages such as a wide viewing angle and a fast response speed.

A display device for playing a game video may display more scenes than a display device operating at a refresh rate of 60 Hz for the same time.

A user may feel a much smoother screen as the refresh rate increases, and a game requiring a fast response speed requires a higher refresh rate.

In addition, when a game video is played, a tearing phenomenon in which the screen is shifted horizontally may occur. The tearing phenomenon occurs when the refresh rate of an image is fixed and an image frame output from a graphic card and an image frame output from a display panel are not synchronized.

In order to prevent the tearing phenomenon, variable refresh rate (VRR) technology of synchronizing the output frequency of the image frame of the graphic card and the refresh rate of the display panel has appeared.

However, when the output frequency of the display panel is set to 120 Hz and the VRR function is activated at 60 Hz, since the display panel is driven at a driving frequency of 60 Hz, the gamma value of a low grayscale region does not match and thus a black floatation phenomenon may occur.

The black floatation phenomenon refers to a phenomenon in which a low grayscale region (dark region) in an image becomes brighter as luminance increases.

This is because, when the VRR function is performed, an OLED emission duration is longer at 60 Hz than at 120 Hz and thus a luminance difference occurs on the display panel.

When the black floatation phenomenon occurs, user's immersion in viewing an image may be disturbed.

SUMMARY

An object of the present disclosure is to prevent a black (or luminance) floatation phenomenon in a low grayscale region during VRR operation using an OLED display panel.

An object of the present disclosure is to prevent the gamma value of a low grayscale region from being changed during VRR operation using an OLED display panel.

A display device according to an embodiment of the present disclosure may include a display panel, an external input interface configured to receive an image signal from an external device, and a controller configured to adjust a gamma value when an input frequency of the image signal is less than an output frequency of the display panel and a variable refresh rate (VRR) function for changing the output frequency according to the input frequency is activated and to output the image signal to the display panel based on the adjusted gamma value.

A method of operating a display device according to an embodiment of the present disclosure may include receiving an image signal from an external device, determining whether an input frequency of the image signal is less than an output frequency of a display panel, determining whether a variable refresh rate (VRR) function for changing the output frequency according to the input frequency is activated, when the input frequency is less than the output frequency, adjusting a gamma value when the input frequency of the image signal is less than the output frequency of the display panel and the VRR function for changing the output frequency according to the input frequency is activated, and outputting the image signal to the display panel based on the adjusted gamma value.

BRIEF DESCRIPTION OF THE DRAWINGS

FIG. 11 is a view illustrating an example in which a black floatation phenomenon occurs in a low grayscale region when a VRR function is turned on.

DETAILED DESCRIPTION

Hereinafter, the present disclosure will be described in more detail with reference to the drawings.

Figure 1:
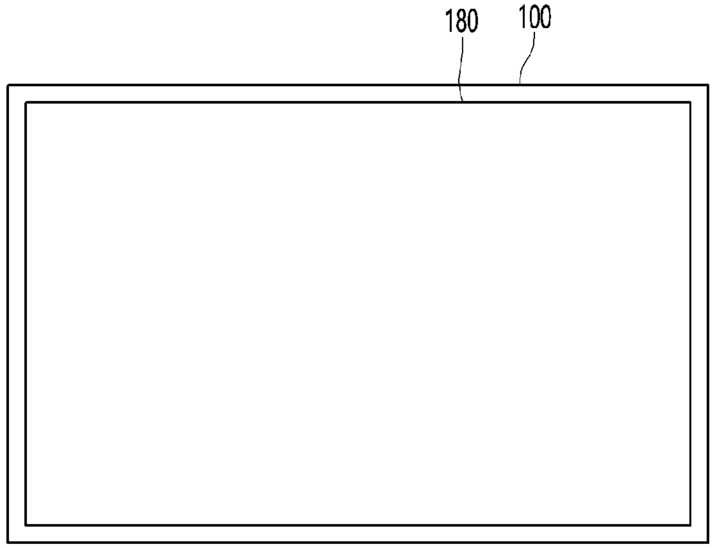
FIG. 1 is a diagram illustrating a display device according to an embodiment of the present disclosure.

FIG. 1 is a diagram illustrating a display device according to an embodiment of the present disclosure.

Referring to the drawings, a display device 100 may include a display unit 180.

Meanwhile, the display unit 180 may be implemented with any one of various panels. For example, the display unit 180 may be any one of a liquid crystal display panel (LCD panel), an organic light emitting diode panel (OLED panel), and an inorganic light emitting diode panel (LED panel).

In the present disclosure, it is assumed that the display unit 180 includes an organic light emitting diode panel (OLED panel). It should be noted that this is only exemplary, and the display unit 180 may include a panel other than an organic light emitting diode panel (OLED panel).

Meanwhile, the display device 100 of FIG. 1 may be a monitor, a TV, a tablet PC, or a mobile terminal.

Figure 2:
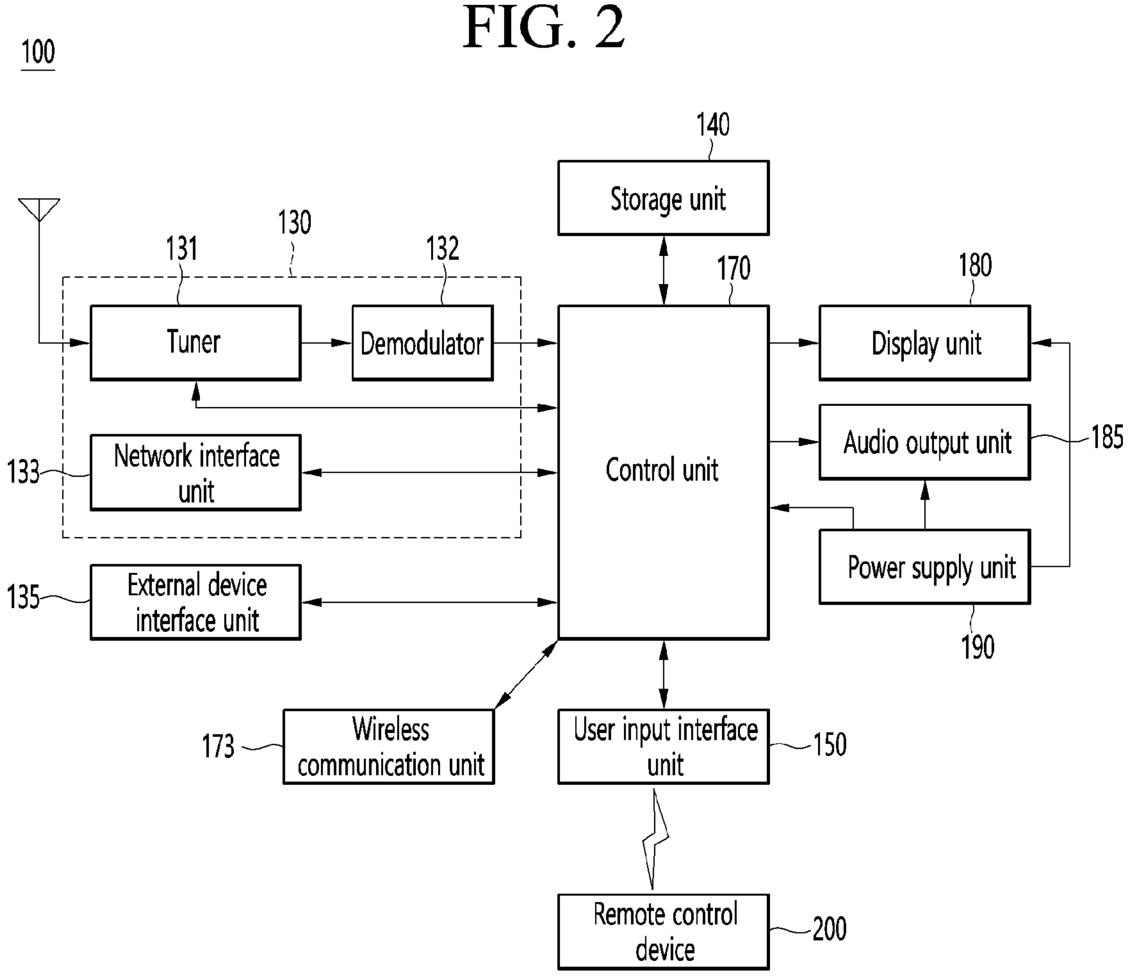
FIG. 2 is a block diagram showing a configuration of the display device of FIG. 1.

FIG. 2 is a block diagram showing a configuration of the display device of FIG. 1.

Referring to FIG. 2, the display device 100 may include a broadcast receiving unit 130, an external device interface unit 135, a storage unit 140, a user input interface unit 150, a control unit 170, and a wireless communication unit 173, a display unit 180, an audio output unit 185, and a power supply unit 190.

The broadcast receiving unit 130 may include a tuner 131, a demodulator 132, and a network interface unit 133.

The tuner 131 may select a specific broadcast channel according to a channel selection command. The tuner 131 may receive a broadcast signal for the selected specific broadcast channel.

The demodulator 132 may separate the received broadcast signal into a video signal, an audio signal, and a data signal related to a broadcast program, and restore the separated video signal, audio signal, and data signal to a format capable of being output.

The network interface unit 133 may provide an interface for connecting the display device 100 to a wired/wireless network including an Internet network. The network interface unit 133 may transmit or receive data to or from other users or other electronic devices through a connected network or another network linked to the connected network.

The network interface unit 133 may access a predetermined web page through the connected network or the other network linked to the connected network. That is, it is possible to access a predetermined web page through a network, and transmit or receive data to or from a corresponding server.

In addition, the network interface unit 133 may receive content or data provided by a content provider or a network operator. That is, the network interface unit 133 may receive content such as a movie, advertisement, game, VOD, broadcast signal, and related information provided by a content provider or a network provider through a network.

In addition, the network interface unit 133 may receive update information and update files of firmware provided by the network operator, and may transmit data to an Internet or content provider or a network operator.

The network interface unit 133 may select and receive a desired application from among applications that are open to the public through a network.

The external device interface unit 135 may receive an application or a list of applications in an external device adjacent thereto, and transmit the same to the control unit 170 or the storage unit 140.

The external device interface unit 135 may provide a connection path between the display device 100 and the external device. The external device interface unit 135 may receive one or more of video and audio output from an external device wirelessly or wired to the display device 100 and transmit the same to the control unit 170. The external device interface unit 135 may include a plurality of external input terminals. The plurality of external input terminals may include an RGB terminal, one or more High Definition Multimedia Interface (HDMI) terminals, and a component terminal.

The video signal of the external device input through the external device interface unit 135 may be output through the display unit 180. The audio signal of the external device input through the external device interface unit 135 may be output through the audio output unit 185.

The external device connectable to the external device interface unit 135 may be any one of a set-top box, a Blu-ray player, a DVD player, a game machine, a sound bar, a smartphone, a PC, a USB memory, and a home theater, but this is only an example.

In addition, a part of content data stored in the display device 100 may be transmitted to a selected user among a selected user or a selected electronic device among other users or other electronic devices registered in advance in the display device 100.

The storage unit 140 may store programs for signal processing and control of the control unit 170, and may store video, audio, or data signals, which have been subjected to signal-processed.

In addition, the storage unit 140 may perform a function for temporarily storing video, audio, or data signals input from an external device interface unit 135 or the network interface unit 133, and store information on a predetermined video through a channel storage function.

The storage unit 140 may store an application or a list of applications input from the external device interface unit 135 or the network interface unit 133.

The display device 100 may play back a content file (a moving image file, a still image file, a music file, a document file, an application file, or the like) stored in the storage unit 140 and provide the same to the user.

The user input interface unit 150 may transmit a signal input by the user to the control unit 170 or a signal from the control unit 170 to the user. For example, the user input interface unit 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the control unit 170 to the remote control device 200.

In addition, the user input interface unit 150 may transmit a control signal input from a local key (not shown) such as a power key, a channel key, a volume key, and a setting value to the control unit 170.

The video signal image-processed by the control unit 170 may be input to the display unit 180 and displayed with video corresponding to a corresponding video signal. Also, the video signal image-processed by the control unit 170 may be input to an external output device through the external device interface unit 135.

The audio signal processed by the control unit 170 may be output to the audio output unit 185. Also, the audio signal processed by the control unit 170 may be input to the external output device through the external device interface unit 135.

In addition, the control unit 170 may control the overall operation of the display device 100.

In addition, the control unit 170 may control the display device 100 by a user command input through the user input interface unit 150 or an internal program and connect to a network to download an application a list of applications or applications desired by the user to the display device 100.

The control unit 170 may allow the channel information or the like selected by the user to be output through the display unit 180 or the audio output unit 185 along with the processed video or audio signal.

In addition, the control unit 170 may output a video signal or an audio signal through the display unit 180 or the audio output unit 185, according to a command for playing back a video of an external device through the user input interface unit 150, the video signal or the audio signal being input from an external device, for example, a camera or a camcorder, through the external device interface unit 135.

Meanwhile, the control unit 170 may allow the display unit 180 to display a video, for example, allow a broadcast video which is input through the tuner 131 or an external input video which is input through the external device interface unit 135, a video which is input through the network interface unit or a video which is stored in the storage unit 140 to be displayed on the display unit 180. In this case, the video displayed on the display unit 180 may be a still image or a moving image, and may be a 2D image or a 3D image.

In addition, the control unit 170 may allow content stored in the display device 100, received broadcast content, or external input content input from the outside to be played back, and the content may have various forms such as a broadcast video, an external input video, an audio file, still images, accessed web screens, and document files.

The wireless communication unit 173 may communicate with an external device through wired or wireless communication. The wireless communication unit 173 may perform short range communication with an external device. To this end, the wireless communication unit 173 may support short range communication using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication unit 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication unit 173 may detect (or recognize) a wearable device capable of communication around the display device 100. Furthermore, when the detected wearable device is an authenticated device to communicate with the display device 100 according to the present disclosure, the control unit 170 may transmit at least a portion of data processed by the display device 100 to the wearable device through the wireless communication unit 173. Therefore, a user of the wearable device may use data processed by the display device 100 through the wearable device.

The display unit 180 may convert a video signals, data signal, or OSD signal processed by the control unit 170, or a video signal or data signal received from the external device interface unit 135 into R, G, and B signals, and generate drive signals.

Meanwhile, the display device 100 illustrated in FIG. 2 is only an embodiment of the present disclosure, and therefore, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 2, the display device 100 may receive a video through the network interface unit 133 or the external device interface unit 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 2 and but also one of an image processing device such as the separated set-top box and a content playback device including the display unit 180 the audio output unit 185.

The audio output unit 185 may receive a signal audio-processed by the control unit 170 and output the same with audio.

The power supply unit 190 may supply corresponding power to the display device 100. Particularly, power may be supplied to the control unit 170 that may be implemented in the form of a system on chip (SOC), the display unit 180 for video display, and the audio output unit 185 for audio output.

Specifically, the power supply unit 190 may include a converter that converts AC power into DC power, and a dc/dc converter that converts a level of DC power.

The remote control device 200 may transmit a user input to the user input interface unit 150. To this end, the remote control device 200 may use Bluetooth, Radio Frequency (RF) communication, Infrared (IR) communication, Ultra Wideband (UWB), ZigBee, or the like. In addition, the remote control device 200 may receive a video, audio, or data signal or the like output from the user input interface unit 150, and display or output the same through the remote control device 200 by video or audio.

Figure 3:
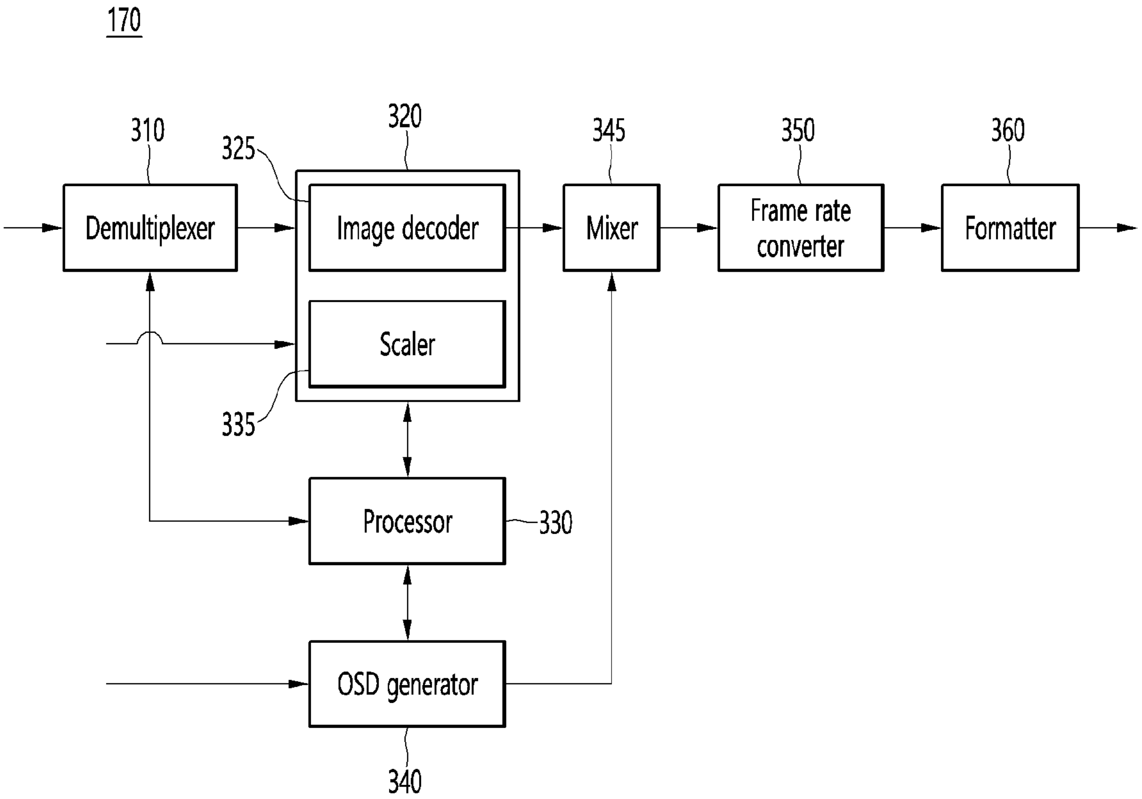
FIG. 3 is an example of an internal block diagram of the control unit of FIG. 2.

FIG. 3 is an example of an internal block diagram of the controller of FIG. 2.

Referring to the drawings, the control unit 170 according to an embodiment of the present disclosure may include a demultiplexer 310, an image processing unit 320, a processor 330, an OSD generator 340, a mixer 345, a frame rate converter 350, and a formatter 360. In addition, an audio processing unit (not shown) and a data processing unit (not shown) may be further included.

The demultiplexer 310 may demultiplex input stream. For example, when MPEG-2 TS is input, the demultiplexer 310 may demultiplex the MPEG-2 TS to separate the MPEG-2 TS into video, audio, and data signals. Here, the stream signal input to the demultiplexer 310 may be a stream signal output from the tuner 131, the demodulator 132 or the external device interface unit 135.

The image processing unit 320 may perform image processing on the demultiplexed video signal. To this end, the image processing unit 320 may include an image decoder 325 and a scaler 335.

The image decoder 325 may decode the demultiplexed video signal, and the scaler 335 may scale a resolution of the decoded video signal to be output through the display unit 180.

The video decoder 325 may be provided with decoders of various standards. For example, an MPEG-2, H.264 decoder, a 3D video decoder for color images and depth images, and a decoder for multi-view images may be provided.

The processor 330 may control the overall operation of the display device 100 or of the control unit 170. For example, the processor 330 may control the tuner 131 to select (tune) an RF broadcast corresponding to a channel selected by a user or a pre-stored channel.

In addition, the processor 330 may control the display device 100 by a user command input through the user input interface unit 150 or an internal program.

In addition, the processor 330 may perform data transmission control with the network interface unit 135 or the external device interface unit 135.

In addition, the processor 330 may control operations of the demultiplexer 310, the image processing unit 320, and the OSD generator 340 in the control unit 170.

The OSD generator 340 may generate an OSD signal according to a user input or by itself. For example, based on a user input signal, a signal for displaying various information on a screen of the display unit 180 as a graphic or text may be generated. The generated OSD signal may include various data such as a user interface screen, various menu screens, widgets, and icons of the display device 100. In addition, the generated OSD signal may include a 2D object or a 3D object.

In addition, the OSD generator 340 may generate a pointer that may be displayed on the display unit 180 based on a pointing signal input from the remote control device 200. In particular, such a pointer may be generated by the pointing signal processing unit, and the OSD generator 340 may include such a pointing signal processing unit (not shown). Of course, the pointing signal processing unit (not shown) may be provided separately, not be provided in the OSD generator 340

The mixer 345 may mix the OSD signal generated by the OSD generator 340 and the decoded video signal image-processed by the image processing unit 320. The mixed video signal may be provided to the frame rate converter 350.

The frame rate converter (FRC) 350 may convert a frame rate of an input video. On the other hand, the frame rate converter 350 may output the input video as it is, without a separate frame rate conversion.

On the other hand, the formatter 360 may change the format of the input video signal into a video signal to be displayed on the display and output the same.

The formatter 360 may change the format of the video signal. For example, it is possible to change the format of the 3D video signal to any one of various 3D formats such as a side by side format, a top/down format, a frame sequential format, an interlaced format, a checker box and the like.

Meanwhile, the audio processing unit (not shown) in the control unit 170 may perform audio processing of a demultiplexed audio signal. To this end, the audio processing unit (not shown) may include various decoders.

In addition, the audio processing unit (not shown) in the control unit 170 may process a base, treble, volume control, and the like.

The data processing unit (not shown) in the control unit 170 may perform data processing of the demultiplexed data signal. For example, when the demultiplexed data signal is an encoded data signal, the demultiplexed data signal may be decoded. The coded data signal may be electronic program guide information including broadcast information such as a start time and an end time of a broadcast program broadcast on each channel.

Meanwhile, a block diagram of the control unit 170 illustrated in FIG. 3 is a block diagram for an embodiment of the present disclosure. The components of the block diagram may be integrated, added, or omitted depending on the specification of the control unit 170 that is actually implemented.

In particular, the frame rate converter 350 and the formatter 360 may not be provided in the control unit 170, and may be separately provided or separately provided as a single module.

Figure 4A:
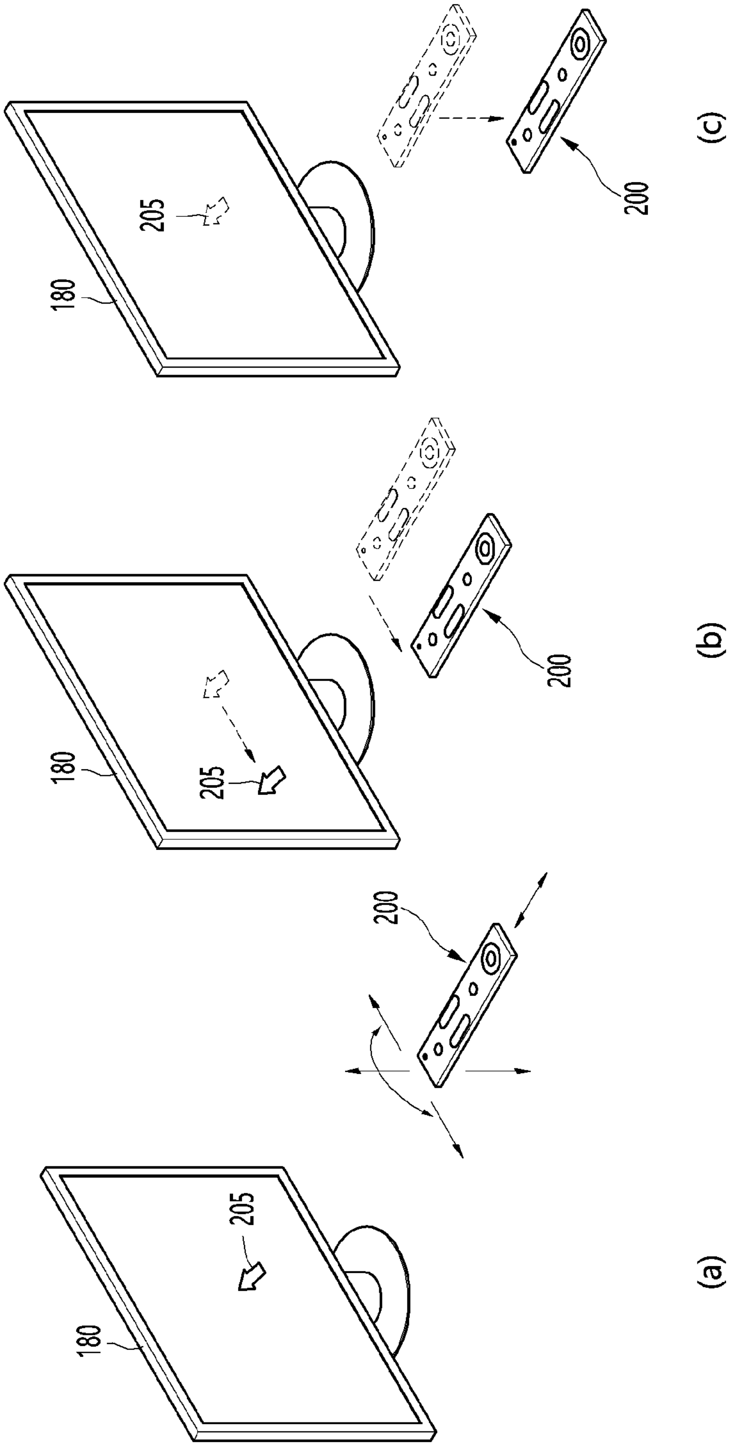
FIG. 4A is a diagram illustrating a control method for a remote control device of FIG. 2.

FIG. 4A is a diagram illustrating a control method for a remote control device of FIG. 2.

In (a) of FIG. 4A, it is illustrated that a pointer 205 corresponding to the remote control device 200 is displayed on the display unit 180.

The user may move or rotate the remote control device 200 up and down, left and right (FIG. 4A (b)), and forward and backward ((c) of FIG. 4A). The pointer 205 displayed on the display unit 180 of the display device may correspond to the movement of the remote control device 200. The remote control device 200 may be referred to as a spatial remote controller or a 3D pointing device, as the corresponding pointer 205 is moved and displayed according to the movement on a 3D space, as shown in the drawing.

In (b) of FIG. 4A, it is illustrated that that when the user moves the remote control device 200 to the left, the pointer 205 displayed on the display unit 180 of the display device moves to the left correspondingly.

Information on the movement of the remote control device 200 detected through a sensor of the remote control device 200 is transmitted to the display device. The display device may calculate the coordinates of the pointer 205 based on information on the movement of the remote control device 200. The display device may display the pointer 205 to correspond to the calculated coordinates.

In (c) of FIG. 4A, it is illustrated that a user moves the remote control device 200 away from the display unit 180 while pressing a specific button in the remote control device 200. Accordingly, a selected region in the display unit 180 corresponding to the pointer 205 may be zoomed in and displayed to be enlarged. Conversely, when the user moves the remote control device 200 close to the display unit 180, the selected region in the display unit 180 corresponding to the pointer 205 may be zoomed out and displayed to be reduced. On the other hand, when the remote control device 200 moves away from the display unit 180, the selected region may be zoomed out, and when the remote control device 200 moves close to the display unit 180, the selected region may be zoomed in.

Meanwhile, in a state in which a specific button in the remote control device 200 is being pressed, recognition of up, down, left, or right movements may be excluded. That is, when the remote control device 200 moves away from or close to the display unit 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Figure 4B:
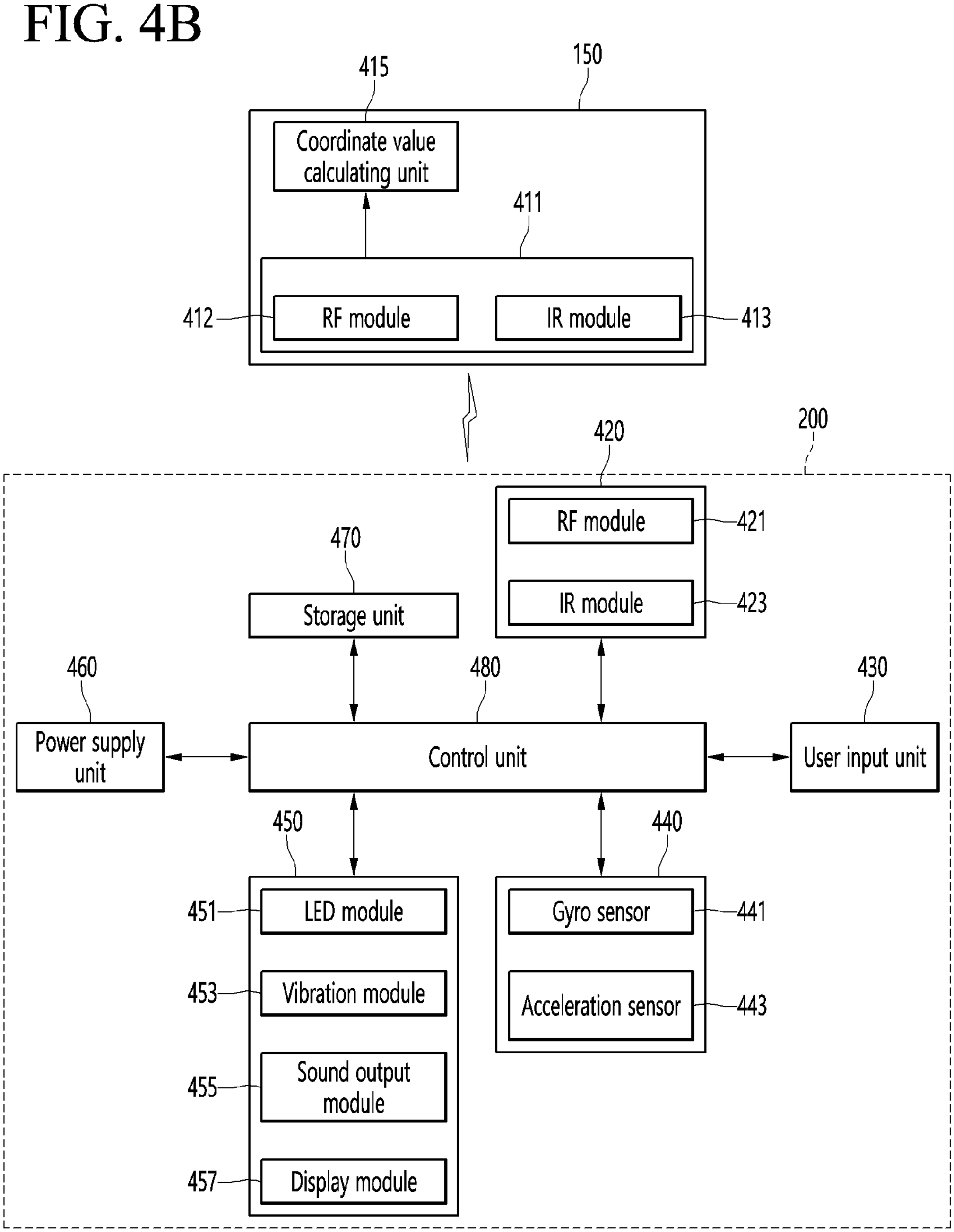
FIG. 4B is an internal block diagram of the remote control device of FIG. 2.

FIG. 4B is an internal block diagram of the remote control device of FIG. 2.

Referring to the drawing, the remote control device 200 may include a wireless communication unit 420, a user input unit 430, a sensor unit 440, an output unit 450, a power supply unit 460, a storage unit 470, ad a control unit 480.

The wireless communication unit 420 may transmit and receive signals to and from any one of the display devices according to the embodiments of the present disclosure described above. Among the display devices according to embodiments of the present disclosure, one display device 100 will be described as an example.

In the present embodiment, the remote control device 200 may include an RF module 421 capable of transmitting and receiving signals to and from the display device 100 according to the RF communication standard. In addition, the remote control device 200 may include an IR module 423 capable of transmitting and receiving signals to and from the display device 100 according to the IR communication standard.

In the present embodiment, the remote control device 200 transmits a signal containing information on the movement of the remote control device 200 to the display device 100 through the RF module 421.

Also, the remote control device 200 may receive a signal transmitted by the display device 100 through the RF module 421. In addition, the remote control device 200 may transmit a command regarding power on/off, channel change, volume adjustment, or the like to the display device 100 through the IR module 423 as necessary.

The user input unit 430 may include a keypad, a button, a touch pad, or a touch screen. The user may input a command related to the display device 100 to the remote control device 200 by operating the user input unit 430. When the user input unit 430 includes a hard key button, the user may input a command related to the display device 100 to the remote control device 200 through a push operation of the hard key button. When the user input unit 430 includes a touch screen, the user may input a command related to the display device 100 to the remote control device 200 by touching a soft key of the touch screen. In addition, the user input unit 430 may include various types of input means that may be operated by a user, such as a scroll key or a jog key, and the present embodiment does not limit the scope of the present disclosure.

The sensor unit 440 may include a gyro sensor 441 or an acceleration sensor 443. The gyro sensor 441 may sense information on the movement of the remote control device 200.

For example, the gyro sensor 441 may sense information on the operation of the remote control device 200 based on the x, y, and z axes. The acceleration sensor 443 may sense information on the movement speed of the remote control device 200 and the like. Meanwhile, a distance measurement sensor may be further provided, whereby a distance to the display unit 180 may be sensed.

The output unit 450 may output a video or audio signal corresponding to the operation of the user input unit 430 or a signal transmitted from the display device 100. The user may recognize whether the user input unit 430 is operated or whether the display device 100 is controlled through the output unit 450.

For example, the output unit 450 may include an LED module 451 that emits light, a vibration module 453 that generates vibration, a sound output module 455 that outputs sound, or a display module 457 that outputs a video when the user input unit 430 is operated or a signal is transmitted and received through the wireless communication unit 420.

The power supply unit 460 supplies power to the remote control device 200. The power supply unit 460 may reduce power consumption by stopping power supply when the remote control device 200 has not moved for a predetermined time. The power supply unit 460 may restart power supply when a predetermined key provided in the remote control device 200 is operated.

The storage unit 470 may store various types of programs and application data required for control or operation of the remote control device 200. When the remote control device 200 transmits and receives signals wirelessly through the display device 100 and the RF module 421, the remote control device 200 and the display device 100 transmit and receive signals through a predetermined frequency band. The control unit 480 of the remote control device 200 may store and refer to information on a frequency band capable of wirelessly transmitting and receiving signals to and from the display device 100 paired with the remote control device 200 in the storage unit 470.

The control unit 480 may control all matters related to the control of the remote control device 200. The control unit 480 may transmit a signal corresponding to a predetermined key operation of the user input unit 430 or a signal corresponding to the movement of the remote control device 200 sensed by the sensor unit 440 through the wireless communication unit 420.

The user input interface unit 150 of the display device 100 may include a wireless communication unit 411 capable of wirelessly transmitting and receiving signals to and from the remote control device 200, and a coordinate value calculating unit 415 capable of calculating coordinate values of a pointer corresponding to the operation of the remote control device 200.

The user input interface unit 150 may transmit and receive signals wirelessly to and from the remote control device 200 through the RF module 412. In addition, signals transmitted by the remote control device 200 according to the IR communication standard may be received through the IR module 413.

The coordinate value calculating unit 415 may correct a hand shake or an error based on a signal corresponding to the operation of the remote control device 200 received through the wireless communication unit 411, and calculate the coordinate values (x, y) of the pointer 205 to be displayed on the display unit 180.

The transmission signal of the remote control device 200 input to the display device 100 through the user input interface unit 150 may be transmitted to the control unit 170 of the display device 100. The control unit 170 may determine information on the operation and key operation of the remote control device 200 based on the signal transmitted by the remote control device 200, and control the display device 100 in response thereto.

As another example, the remote control device 200 may calculate pointer coordinate values corresponding to the operation and output the same to the user input interface unit 150 of the display device 100. In this case, the user input interface unit 150 of the display device 100 may transmit information on the received pointer coordinate values to the control unit 170 without a separate process of correcting a hand shake or error.

In addition, as another example, the coordinate value calculating unit 415 may be provided in the control unit 170 instead of the user input interface unit 150 unlike the drawing.

Figure 5:
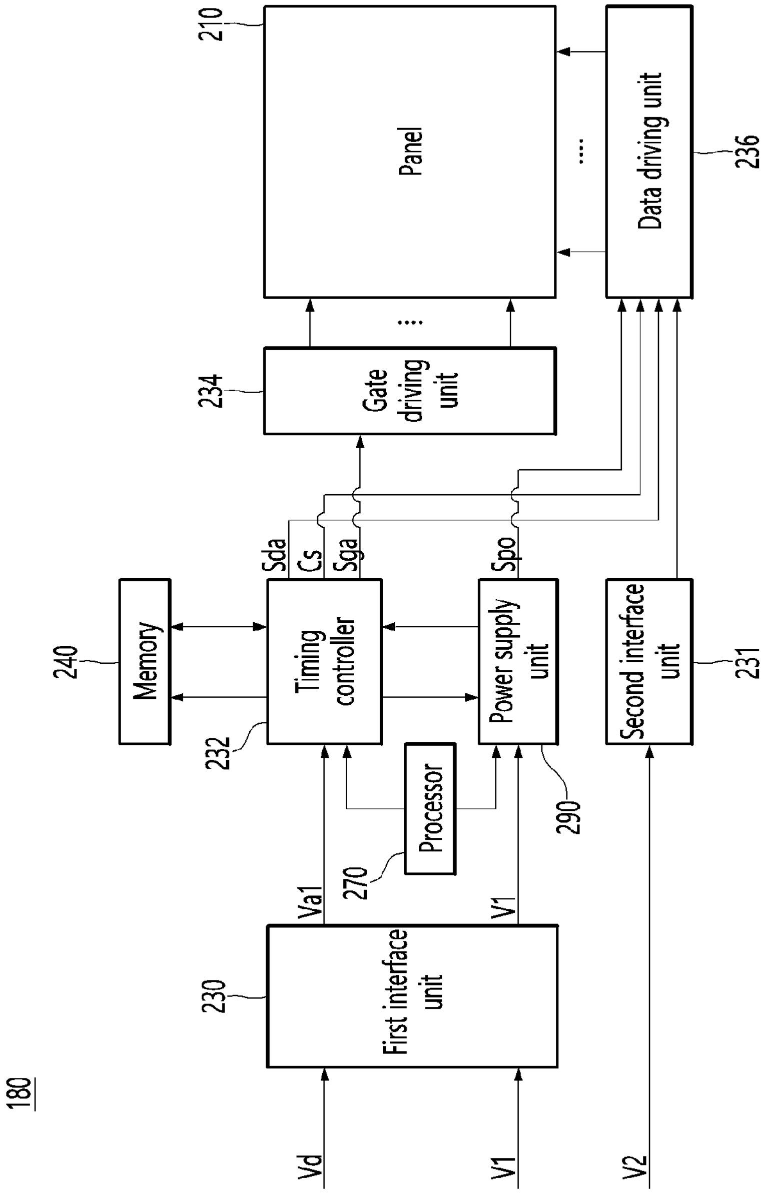
FIG. 5 is an internal block diagram of the display unit of FIG. 2.

FIG. 5 is an internal block diagram of the display unit of FIG. 2.

Referring to the drawing, the display unit 180 based on an organic light emitting panel may include a panel 210, a first interface unit 230, a second interface unit 231, a timing controller 232, a gate driving unit 234, a data driving unit 236, a memory 240, a processor 270, a power supply unit 290, and the like.

The display unit 180 may receive a video signal Vd, first DC power V1, and second DC power V2, and display a predetermined video based on the video signal Vd.

Meanwhile, the first interface unit 230 in the display unit 180 may receive the video signal Vd and the first DC power V1 from the control unit 170.

Here, the first DC power supply V1 may be used for the operation of the power supply unit 290 and the timing controller 232 in the display unit 180.

Next, the second interface unit 231 may receive the second DC power V2 from the external power supply unit 190. Meanwhile, the second DC power V2 may be input to the data driving unit 236 in the display unit 180.

The timing controller 232 may output a data driving signal Sda and a gate driving signal Sga based on the video signal Vd.

For example, when the first interface unit 230 converts the input video signal Vd and outputs the converted video signal val, the timing controller 232 may output the data driving signal Sda and the gate driving signal Sga based on the converted video signal val.

The timing controller 232 may further receive a control signal, a vertical synchronization signal Vsync, and the like, in addition to the video signal Vd from the control unit 170.

In addition, the timing controller 232 may output the gate driving signal Sga for the operation of the gate driving unit 234 and the data driving signal Sda for operation of the data driving unit 236 based on a control signal, the vertical synchronization signal Vsync, and the like, in addition to the video signal Vd.

In this case, the data driving signal Sda may be a data driving signal for driving of RGBW subpixels when the panel 210 includes the RGBW subpixels.

Meanwhile, the timing controller 232 may further output the control signal Cs to the gate driving unit 234.

The gate driving unit 234 and the data driving unit 236 may supply a scan signal and the video signal to the panel 210 through a gate line GL and a data line DL, respectively, according to the gate driving signal Sga and the data driving signal Sda from the timing controller 232. Accordingly, the panel 210 may display a predetermined video.

Meanwhile, the panel 210 may include an organic light emitting layer and may be arranged such that a plurality of gate lines GL intersect a plurality of data lines DL in a matrix form in each pixel corresponding to the organic light emitting layer to display a video.

Meanwhile, the data driving unit 236 may output a data signal to the panel 210 based on the second DC power supply V2 from the second interface unit 231.

The power supply unit 290 may supply various levels of power to the gate driving unit 234, the data driving unit 236, the timing controller 232, and the like.

The processor 270 may perform various control of the display unit 180. For example, the gate driving unit 234, the data driving unit 236, the timing controller 232 or the like may be controlled.

Figure 6A:
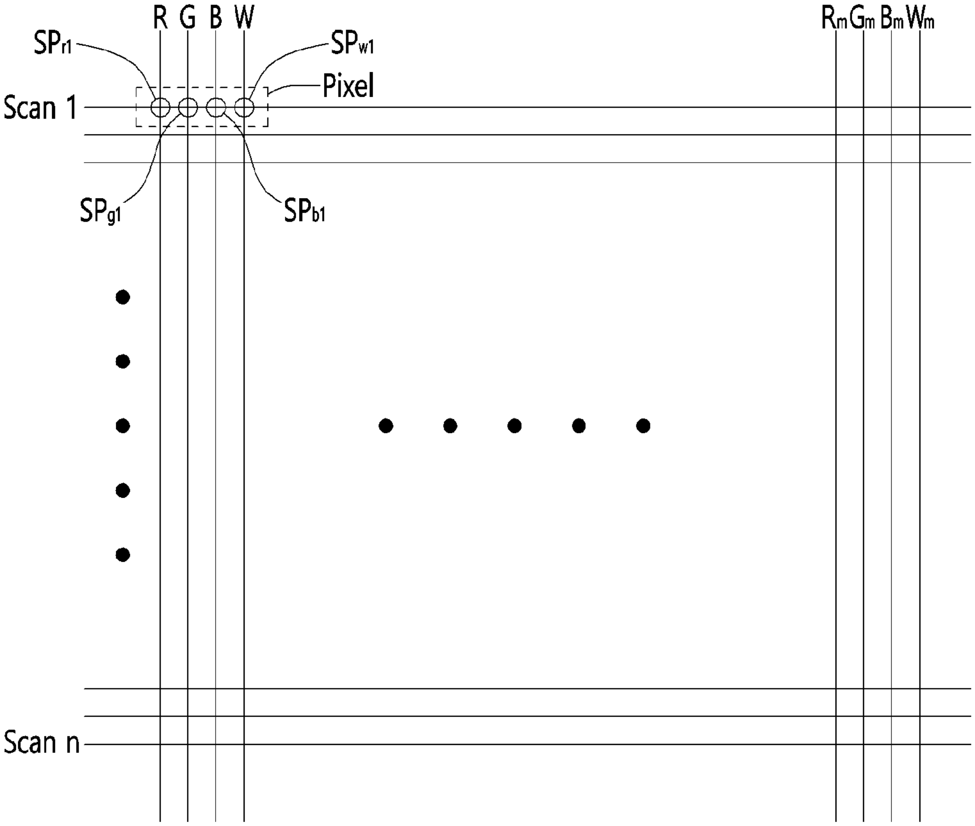
FIGS. 6A to 6B are views referred to for description of the organic light emitting panel of FIG. 5.
Figure 6B:
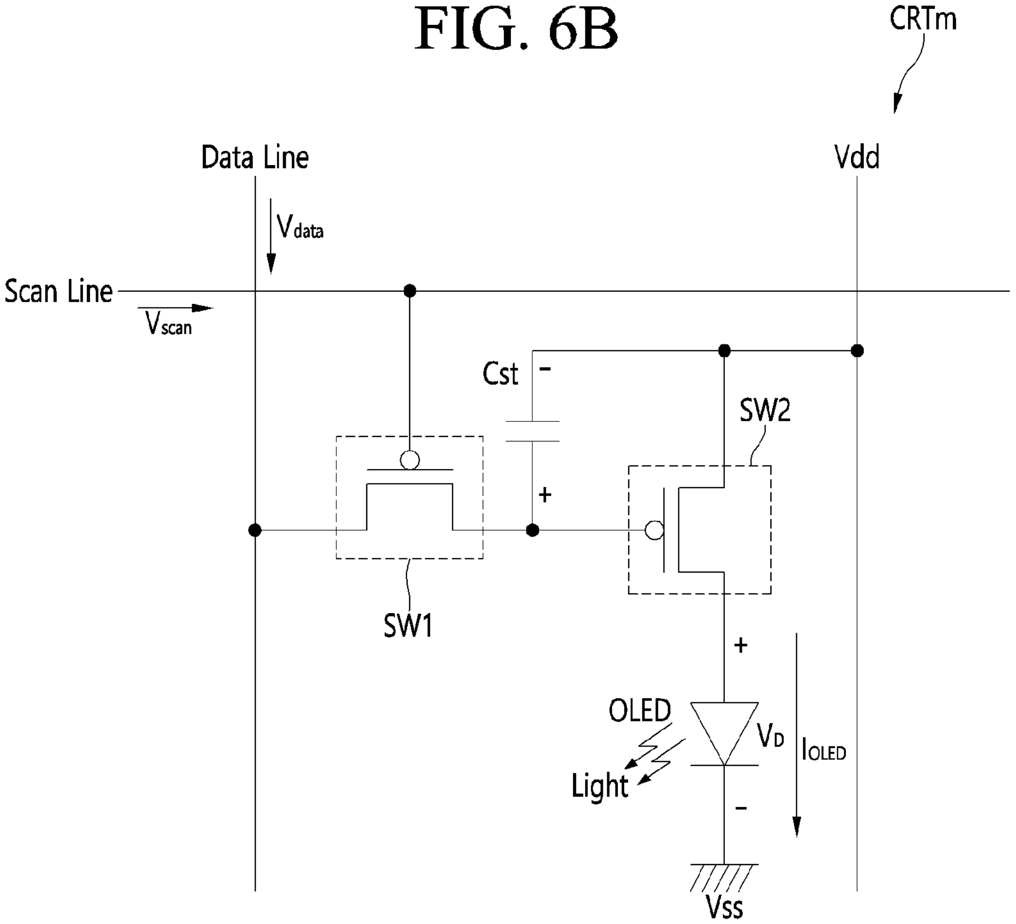

FIGS. 6A to 6B are views referred to for description of the organic light emitting panel of FIG. 5.

First, FIG. 6A is a diagram showing a pixel in the panel 210. The panel 210 may be an organic light emitting panel.

Referring to the drawing, the panel 210 may include a plurality of scan lines (Scan 1 to Scan n) and a plurality of data lines (R1, G1, B1, W1 to Rm, Gm, Bm and Wm) intersecting the scan lines.

Meanwhile, a pixel is defined at an intersection region of the scan lines and the data lines in the panel 210. In the drawing, a pixel having RGBW sub-pixels SPr1, SPg1, SPb1, and SPw1 is shown.

In FIG. 6A, although it is illustrated that the RGBW sub-pixels are provided in one pixel, RGB subpixels may be provided in one pixel. That is, it is not limited to the element arrangement method of a pixel.

FIG. 6B illustrates a circuit of a sub pixel in a pixel of the organic light emitting panel of FIG. 6A.

Referring to the drawing, an organic light emitting subpixel circuit CRTm may include a scan switching element SW1, a storage capacitor Cst, a driving switching element SW2, and an organic light emitting layer OLED, as active elements.

The scan switching element SW1 may be connected to a scan line at a gate terminal and may be turned on according to a scan signal Vscan, which is input. When the scan switching element SW1 is turned on, the input data signal Vdata may be transferred to the gate terminal of the driving switching element SW2 or one terminal of the storage capacitor Cst.

The storage capacitor Cst may be formed between the gate terminal and the source terminal of the driving switching element SW2, and store a predetermined difference between the level of a data signal transmitted to one terminal of the storage capacitor Cst and the level of the DC power Vdd transferred to the other terminal of the storage capacitor Cst.

For example, when the data signals have different levels according to a Pluse Amplitude Modulation (PAM) method, the level of power stored in the storage capacitor Cst may vary according to a difference in the level of the data signal Vdata.

As another example, when the data signals have different pulse widths according to the Pluse Width Modulation (PWM) method, the level of the power stored in the storage capacitor Cst may vary according to a difference in the pulse width of the data signal Vdata.

The driving switching element SW2 may be turned on according to the level of the power stored in the storage capacitor Cst. When the driving switching element SW2 is turned on, a driving current IDLED, which is proportional to the level of the stored power, flows through the organic light emitting layer OLED. Accordingly, the organic light emitting layer OLED may perform a light emitting operation.

The organic light emitting layer (OLED) includes a light emitting layer (EML) of RGBW corresponding to a sub-pixel, and may include at least one of a hole injection layer (HIL), a hole transport layer (HTL), an electron transport layer (ETL), and an electron injection layer (EIL) and may further include a hole blocking layer.

On the other hand, the sub pixels may emit white light in the organic light emitting layer (OLED) but, in the case of green, red, blue sub-pixels, a separate color filter is provided for realization of color. That is, in the case of green, red, and blue subpixels, green, red, and blue color filters are further provided, respectively. Meanwhile, since a white sub-pixel emits white light, a separate color filter is unnecessary.

On the other hand, although p-type MOSFETs are illustrated as the scan switching element SW1 and the driving switching element SW2 in the drawing, n-type MOSFETs or other switching elements such as JFETs, IGBTs, or SICs may be used.

Figure 7:
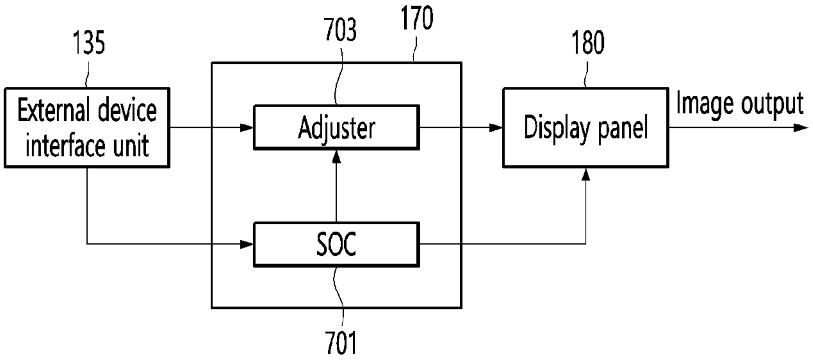
FIG. 7 is a block diagram of a display device according to another embodiment of the present disclosure.

FIG. 7 is a block diagram of a display device according to another embodiment of the present disclosure.

A frequency described below may mean a fresh rate of an image.

An input frequency may be a driving frequency of an image signal input through the external device interface unit 135.

An output frequency may represent a driving frequency of an image signal when the display panel 180 outputs the image signal.

It is assumed that the output frequency of the image of the display panel 180 is set to a preset output frequency. The output frequency may be 120 Hz.

The external device interface unit 135 may receive the image signal from an external device connected to the display device 100.

The external device interface unit 135 may include at least one HDMI terminal.

The external device interface unit 135 may be connected to a set-top box or a PC.

A system on chip (SOC) 701 may detect the input frequency of the image signal input through the external device interface unit 135.

The SOC 701 may receive information on the input frequency of the image signal from the external device.

The SOC 701 may determine whether a VRR function is turned on. The VRR function may refer to a function for changing the output frequency of the display panel 180 according to the input frequency of the image signal.

The SOC 701 may determine whether the VRR function is turned on or off through a setting menu for setting activation of the VRR function.

The SOC 701 may transmit the input frequency of the image signal and information on activation of the VRR function to an adjuster 703.

The adjuster 703 may adjust the gamma value of the display panel 180 according to the input frequency of the image signal and activation of the VRR function.

The adjuster 703 may adjust the gamma value when the input frequency of the image signal is less than the output frequency of the display panel 180 and the VRR function is activated.

Specifically, the adjuster 703 may adjust an existing gamma value to a gamma value suiting the input frequency, when the input frequency of the image signal is less than the output frequency of the display panel 180 and the VRR function is activated.

In particular, the adjuster 703 may adjust a gamma value for a low grayscale region. The low grayscale region may be a region of an image corresponding to gray levels of 0 to 20 among gray levels of 0 to 255.

The SOC 701 may be called a main board.

The SOC 701 and the adjuster 703 may be included in the control unit 170.

Figure 8:
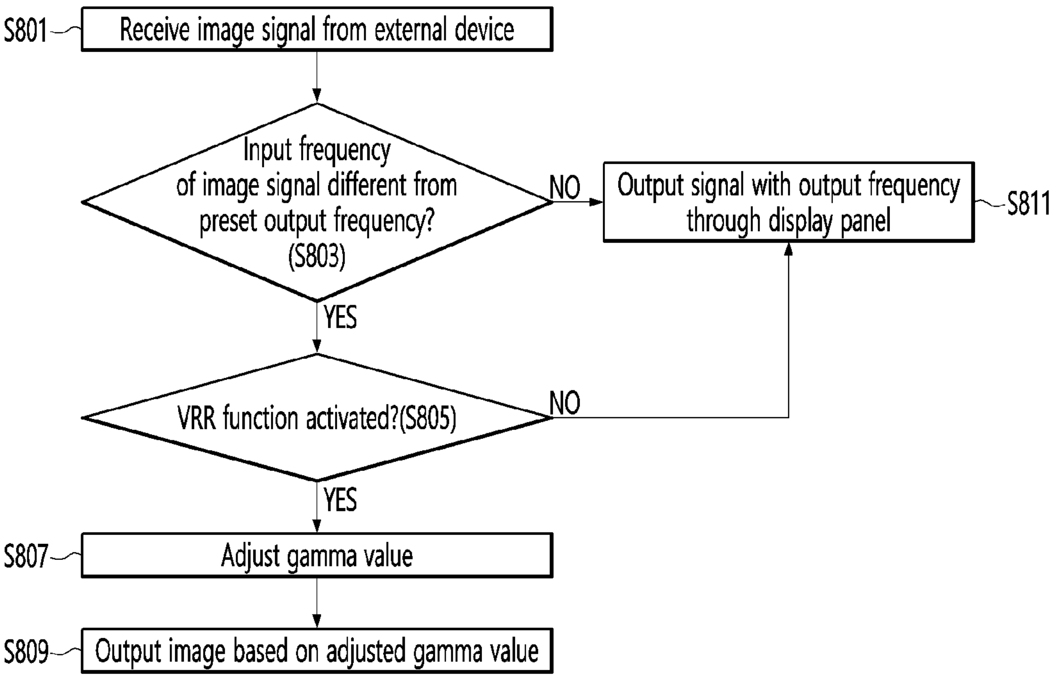
FIG. 8 is a flowchart illustrating a method of operating a display device according to an embodiment of the present disclosure.

FIG. 8 is a flowchart illustrating a method of operating a display device according to an embodiment of the present disclosure.

Hereinafter, the method of operating the display device 100 will be described in connection with the embodiment of FIG. 7.

The control unit 170 of the display device 100 receives an image signal from an external device connected to the display device 100 through the external device interface unit 135 (S801).

The external device interface unit 135 may include one or more high definition multimedia interface (HDMI) terminals.

The external device interface unit 135 may receive the image signal through the external device connected through the HDMI terminal.

The control unit 170 determines whether an input frequency of the received image signal is different from a preset output frequency of the display panel 180 (S803).

The input frequency may represent the number of image frames input per second through the external device interface unit 135.

The control unit 170 may receive information on the input frequency of the image signal from the external device. For example, the control unit 170 may receive flag information indicating the input frequency of the image signal from the external device.

The flag information may be included in the image signal or may be received separately from the image signal.

The output frequency (or the driving frequency) of the display panel 180 may be set to 120 Hz, but this is only an example and may vary according to user's settings.

The input frequency of the image signal may be 60 Hz, but this is not limited thereto and may be any one of 25 Hz, 50 Hz, 100 Hz or 120 Hz. The input frequency of the image signal may also vary according to user's settings.

The input frequency of the image signal may represent the refresh rate of a graphic card included in the external device.

The output frequency of the display panel 180 may represent the refresh rate of the display panel 180.

The control unit 170 may obtain the output frequency of the display panel 180 through the SOC 171.

The control unit 170 may determine whether the input frequency of the image signal is equal to or different from the output frequency of the display panel 180, based on the flag information received from the external device.

The control unit 170 determines whether a variable refresh rate (VRR) function is activated (S805), when the input frequency of the received image signal is different from the output frequency.

The VRR function may refer to a function for changing the output frequency of the display panel 180 to suit the input frequency of the image signal. The VRR function may be mainly used when a video is played.

In an embodiment, whether the VRR function is activated may vary depending on whether the user sets the VRR function on the setting menu.

That is, when the VRR function is turned on through user input on the setting menu, it may be determined that the VRR function is activated and, when the VRR function is turned off, it may be determined that the VRR function is deactivated.

The control unit 170 may transmit, to the display panel 180, a control signal for changing the output frequency of the display panel 180 to the input frequency, when the VRR function is activated. The display panel 180 may change the output frequency to the input frequency according to the control signal received from the control unit 170.

That is, the control unit 170 may synchronize the refresh rate of the graphic card and the refresh rate of the display panel 180, when the VRR function is activated.

The control unit 170 adjusts the gamma value of the image signal (S807) when the VRR function is activated.

In an embodiment, the control unit 170 may increase the gamma value of the input image signal when the VRR function is activated. Specifically, the control unit 170 may increase the gamma value to reduce the luminance of the low grayscale region.

An increase in the gamma value for the low grayscale region may be represented by an increase in RGB OFFSET GAIN.

The low grayscale region may correspond to levels of 0 to 10, 20 or 40 among gray scales of 0 to 255, but this is only an example.

When the low grayscale region corresponds to gray scales of 0 to 20, gray scales of 21 to 255 may correspond to a high gray scale region.

When the gamma value increases, the luminance of the low grayscale region may be decreased and, when the luminance of the low grayscale region decreases, a black floatation phenomenon in the low grayscale region may decrease.

The control unit 170 outputs the image signal through the display panel 180 based on the adjusted gamma value (S809).

The control unit 170 may output an image signal with reduced luminance according to the adjusted gamma value.

The control unit 170 may adjust a previously set gamma value to a new gamma value.

The control unit 170 may convert the image signal with the adjusted gamma value and output the converted image signal through the display panel 180.

Meanwhile, the control unit 170 outputs the image signal with the output frequency through the display panel 180 (S811), when the input frequency of the received image signal is equal to the preset output frequency of the display panel 180.

In addition, the control unit 170 converts the input frequency of the image signal into the output frequency and outputs the image signal with the output frequency through the display panel 180 (S811), even when the input frequency of the received image signal is different from the preset output frequency of the display panel 180.

Hereinafter, the cause of the black floatation phenomenon occurred in the prior art and a method of solving occurrence of the black floatation phenomenon will be described in greater detail.

Figure 9A:
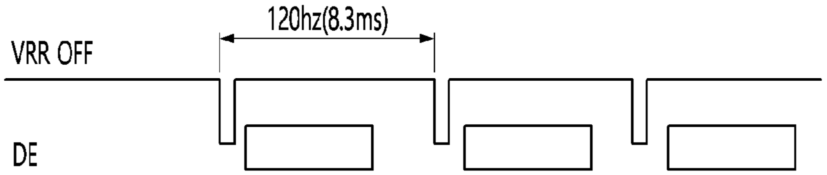
FIGS. 9*a* and 9*b* are views illustrating the reason why a black floatation phenomenon occurs according to VRR operation in the prior art.
Figure 9B:

FIGS. 9*a* and 9*b* are views illustrating the reason why a black floatation phenomenon occurs according to VRR operation in the prior art.

In FIGS. 9*a* and 9*b*, it is assumed that the output frequency of the display panel 180 is set to 120 Hz.

In addition, in FIG. 9*a*, it is assumed that the VRR function is turned off. In FIG. 9*b*, it is assumed that the VRR function is turned on and the output frequency of the display panel 180 is changed according to the input frequency of 60 Hz.

In FIG. 9*a*, when the VRR function is turned off, an OLED emission duration for one image frame is 8.3 ms. In FIG. 9*b*, when the VRR function is turned on, an OLED emission duration for one image frame is 16.6 ms Accordingly, when entering the VRR mode, the OLED emission duration further increases, thereby increasing luminance.

An increase in luminance is slightly more conspicuous in the low grayscale region (black region). That is, an increase in luminance in the low grayscale region may be more conspicuous than an increase in luminance in the high grayscale region.

This will be described.

Figure 10A:
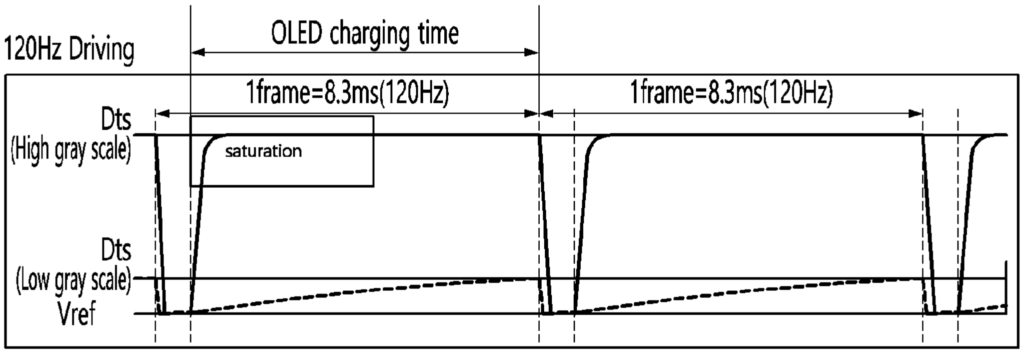
FIGS. 10*a* and 10*b* are views illustrating the reason why a black floatation phenomenon occurs more in a low grayscale region than in a high grayscale region during VRR operation.
Figure 10B:
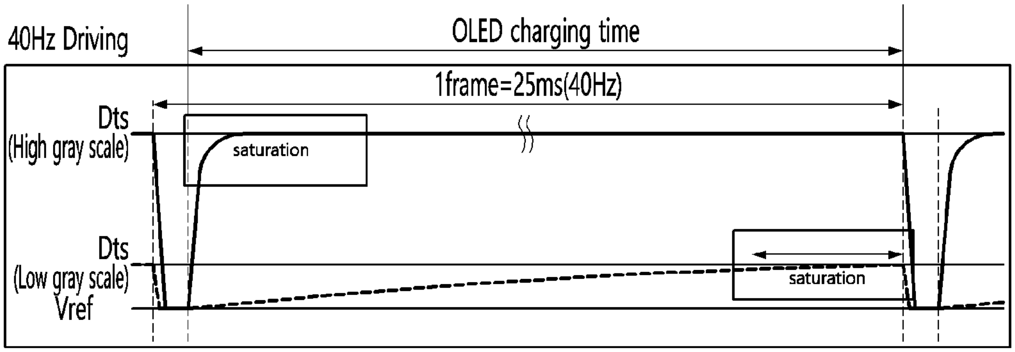

FIGS. 10*a* and 10*b* are views illustrating the reason why a black floatation phenomenon occurs more in a low grayscale region than in a high grayscale region during VRR operation.

In FIGS. 10*a* and 10*b*, it is assumed that the output frequency of the display panel 180 is set to 120 Hz.

In addition, in FIG. 10*a*, it is assumed that the VRR function is turned off. In FIG. 10*b*, it is assumed that the VRR function is turned on and the input frequency is 40 Hz. Accordingly, in FIG. 10*b*, the display panel 180 is driven at 40 Hz.

When the VRR function is turned on, the driving frequency of the display panel 180 may be changed from 120 Hz to 40 Hz. In this case, one frame period increases from 8.3 ms to about 25 ms. That is, during one frame period, a blank period without image data increases.

In addition, as VRR operation is performed, the charging time of an OLED element also increases.

In this case, as shown in FIG. 10*b*, in the high grayscale region and the low grayscale region, a time when the charging signal is saturated may increase, thereby increasing luminance.

However, when the time when the charging signal is saturated increases in the low grayscale region, the user does not feel a slight change in luminance in the high grayscale region.

In contrast, when the time when the charging signal is saturated increases in the low grayscale region, a slight increase in luminance is visible to user's eyes. That is, a black floatation phenomenon in which luminance becomes bright may occur.

Figure 11:
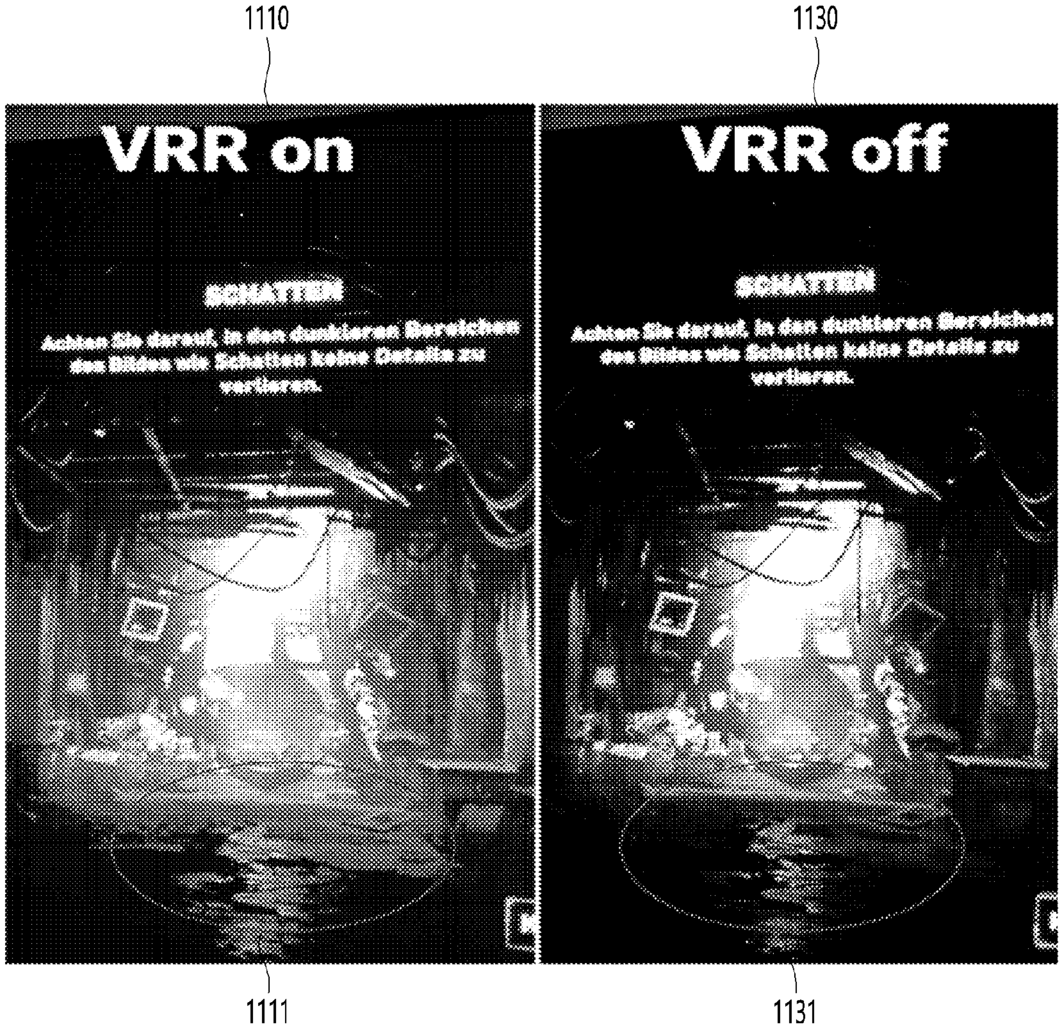

FIG. 11 is a view illustrating an example in which a black floatation phenomenon occurs in a low grayscale region when a VRR function is turned on.

Referring to FIG. 11, screens 1110 and 1130 captured at the same viewpoint of the video are shown.

A first captured screen 1110 refers to a screen captured in a state in which the VRR function is turned on and a second captured screen 1130 refers to a screen captured in a state in which the VRR function is turned off.

A first region 1111 of the first captured screen 1110 and a second region 1131 of the second captured screen 1130 are low grayscale regions at the same position.

It can be seen that the first region 1111 of the first captured screen 1110 is brighter than the second region 1131 of the second screen 1130. That is, it can be seen that, as the VRR function is turned on, the black floatation phenomenon occurs in the first region 1111.

If the black floatation phenomenon occurs, the user may experience reduced immersion and may feel uncomfortable when viewing a video.

In the embodiment of the present disclosure, the display device 100 may adjust the gamma value to reduce the luminance of the low grayscale region, when the input frequency of the image signal is less than the output frequency of the display panel 180 and the VRR function is activated.

Figure 12A:
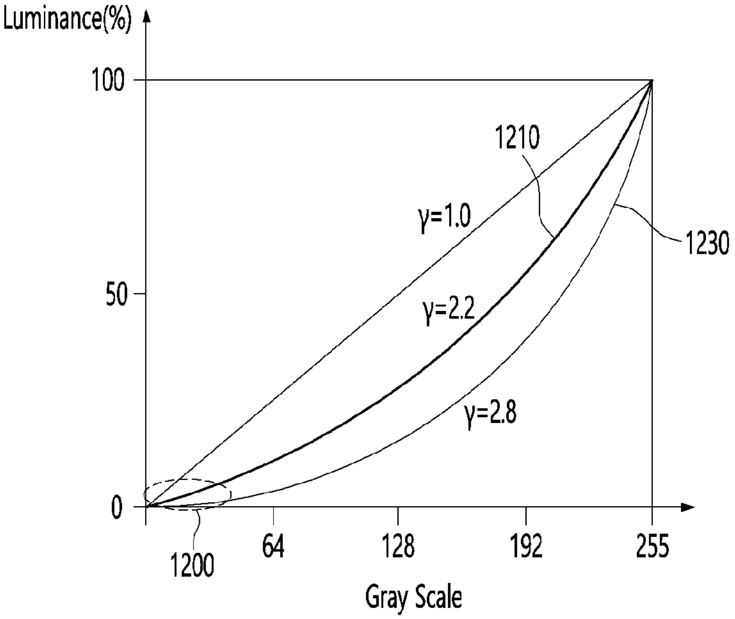
FIGS. 12*a* and 12*b* are views illustrating a process of adjusting a gamma value when a VRR function is activated according to an embodiment of the present disclosure.
Figure 12B:
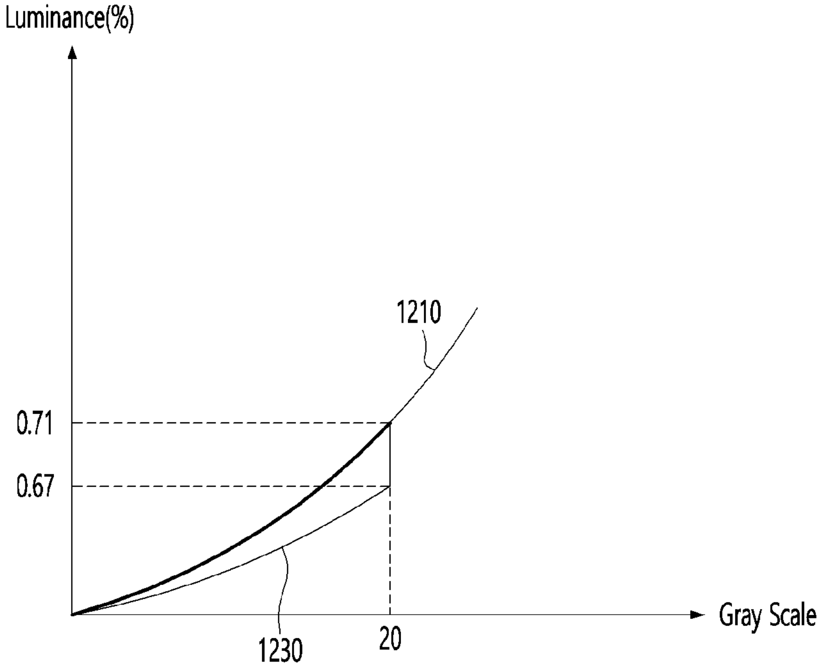

FIGS. 12*a* and 12*b* are views illustrating a process of adjusting a gamma value when a VRR function is activated according to an embodiment of the present disclosure.

Referring to FIG. 12*a*, gamma curves representing correlation between a gray scale (image brightness) and luminance.

A first gamma curve 1210 is a curve when a γ value is 2, and a second gamma curve 1230 is a curve when a γ value is 2.8.

The gamma value may represent correlation between the brightness of the image input to the display panel 180 and the luminance of the image.

First, it is assumed that, before the VRR function is activated, γ is set to 2.2.

Thereafter, when the VRR function is activated, the display device 100 may increase the γ value.

The display device 100 may increase the γ value, when an input signal with an input frequency less than a preset output frequency is input and the VRR function is activated.

The display device 100 may adjust the γ value based on the input frequency.

The display device 100 may determine the γ value using a gamma table representing a correspondence relation between the input frequency and the γ value.

The display device 100 may output an image signal corrected with the determined γ value through the display panel 180.

For example, referring to FIG. 12*a*, the display device 100 may increase the γ value from 2.2 to 2.8, when the image signal with the input frequency less than the preset output frequency is input and the VRR function is activated.

That is, the display device 100 may adjust the first gamma curve 1210 to the second gamma curve 1230.

When the γ value increases, luminance may be reduced. In particular, the luminance reduction ratio in the low grayscale region 1200 may be greater than the luminance reduction ratio in the high grayscale region.

In another embodiment, the display device 100 may adjust the gamma value only in the low grayscale region.

Referring to FIG. 12*b*, at a gray level of 20 in the low grayscale region (gray levels of 0 to 20), luminance is 7.1 when the γ value is 2.2 and luminance is 6.7 when the γ value is 2.8.

That is, luminance is reduced from 7.1 to 6.7 by 5.6%.

The display device 100 may increase the γ value in the low grayscale region to reduce luminance in the low grayscale region, when the input frequency is less than the preset output frequency and the VRR function is activated.

The display device 100 may increase the γ value from 2.2 to 2.8 with respect to the low grayscale region (gray levels of 0 to 20) and maintain the γ value with respect to the remaining grayscale region (gray levels of 21 to 255).

That is, the display device 100 may adjust the gamma value to adjust luminance according to the second gamma curve 1230 with respect to the low grayscale region (gray levels of 0 to 20) and to adjust luminance according to the first gamma curve 1210 with respect to the remaining grayscale region (gray levels of 21 to 255).

When luminance is reduced in the low grayscale region, the black floatation phenomenon may be greatly improved.

Figures 13, 14:
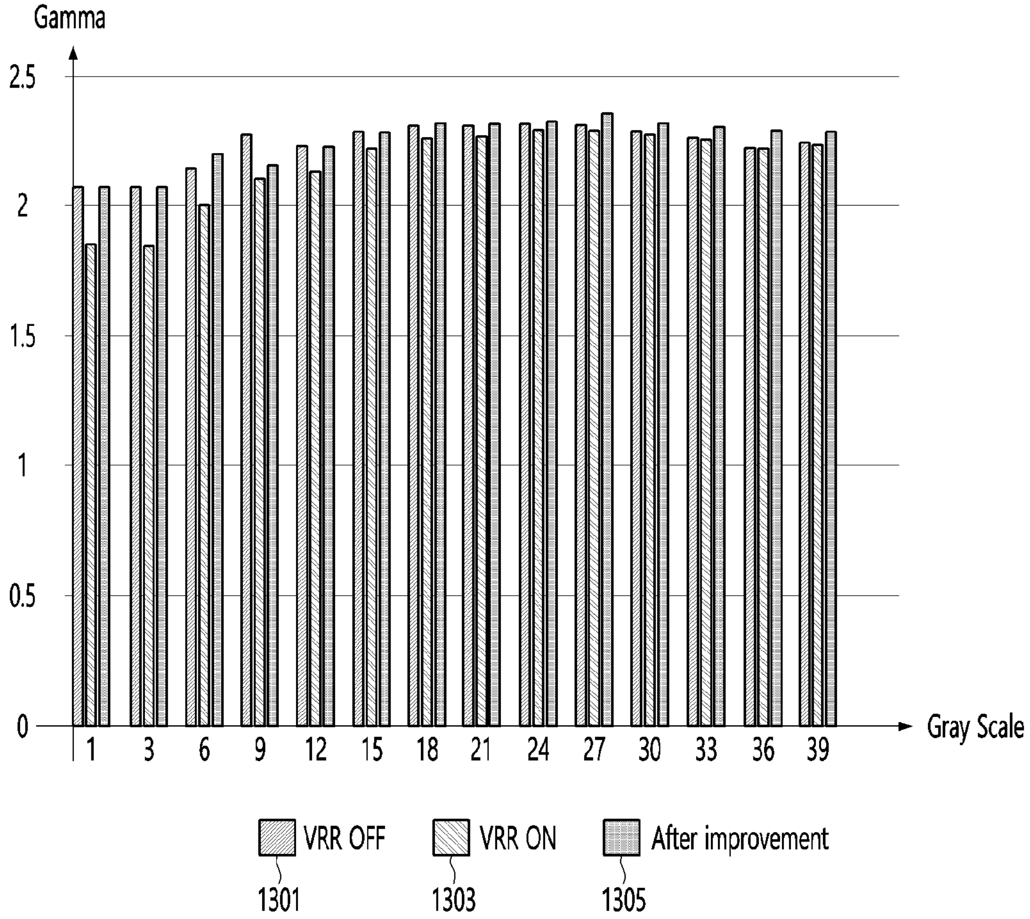
FIG. 13 is a graph showing an increase in a gamma value when a VRR function is turned on according to an embodiment of the present disclosure, as compared to the prior art.
FIGS. 14 and 15 are views illustrating a decrease in luminance in a low grayscale region according to an input frequency of an image signal, when a gamma value is corrected in a state in which a VRR function is turned on according to an embodiment of the present disclosure.

FIG. 13 is a graph showing an increase in a gamma value when a VRR function is turned on according to an embodiment of the present disclosure, as compared to the prior art.

Referring to FIG. 13, a first bar indicator 1301 shows a gamma value versus a gray level in a state in which the VRR function is turned off, a second bar indicator 1303 shows a gamma value versus a gray level in a state in which the VRR function is turned on, and a third bar indicator 1305 shows a gamma value versus an adjusted gray level in a state in which the VRR function is turned on.

Through comparison between the second bar indicator 1303 according to the prior art and the third bar indicator 1305 according to the embodiment of the present disclosure, it can be seen that the gamma value when the embodiment of the present disclosure is applied is further increased.

Figures 15, 16, 17:
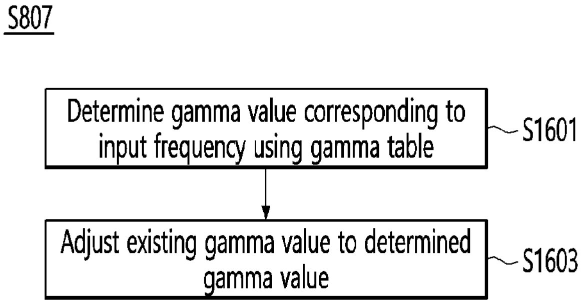
FIG. 16 is a view illustrating a process of determining a gamma value according to an input frequency according to an embodiment of the present disclosure.
FIG. 17 is a view illustrating a gamma table according to an embodiment of the present disclosure.

FIGS. 14 and 15 are views illustrating a decrease in luminance in a low grayscale region according to an input frequency of an image signal, when a gamma value is corrected in a state in which a VRR function is turned on according to an embodiment of the present disclosure.

In FIGS. 14 and 15, it is assumed that the brightness of the image is set to gray levels of 0 to 255 and the output frequency of the display panel 180 is set to 120 Hz.

FIG. 14 is a view illustrating reduction in luminance value for a gray level of 10 according to the input frequency when the gamma value is corrected and FIG. 15 is a view showing reduction in luminance value for a gray level of 20 according to the input frequency when the gamma value is corrected.

First, FIG. 14 will be described.

Referring to FIG. 14, it can be seen that, when the gamma value increases for each input frequency of the image signal, the luminance value is reduced at a gray level of 10.

For example, the luminance value for a gray level of 10 at 25 Hz was reduced from 0.35 to 0.25, the luminance value for a gray level of 10 at 50 Hz was reduced from 0.3 to 0.25, the luminance value for a gray level of 10 at 60 Hz was reduced from 0.29 to 0.25, and the luminance value for a gray level of 10 at 100 Hz was reduced from 0.27 to 0.25.

(At 120 Hz, even when the VRR function is turned on, since the output frequency of the display panel 180 is 120 Hz, there is no frequency change and thus there is no meaning of gamma correction)

In this way, when the input frequency of the image signal is less than the preset output frequency of the display panel 180 and the VRR function is turned on, the luminance value may be reduced in the low grayscale region as the gamma value increases.

Therefore, it is possible to minimize the black floatation phenomenon in the low grayscale region.

Next, FIG. 15 will be described.

Referring to FIG. 15, it can be seen that, when the gamma value increases for each input frequency of the image signal, the luminance value is reduced at a gray level of 20.

For example, the luminance value for a gray level of 20 at 25 Hz was reduced from 0.82 to 0.67, the luminance value for a gray level of 20 at 50 Hz was reduced from 0.72 to 0.67, the luminance value for a gray level of 20 at 60 Hz was reduced from 0.71 to 0.67, and the luminance value for a gray level of 20 at 100 Hz was reduced from 0.69 to 0.67.

(At 120 Hz, even when the VRR function is turned on, since the output frequency of the display panel 180 is 120 Hz, there is no frequency change and thus there is no meaning of gamma correction)

In this way, when the input frequency of the image signal is less than the preset output frequency of the display panel 180 and the VRR function is turned on, the luminance value may be reduced in the low grayscale region as the gamma value increases.

Therefore, it is possible to minimize the black floatation phenomenon in the low grayscale region.

FIG. 16 is a view illustrating a process of determining a gamma value according to an input frequency according to an embodiment of the present disclosure.

The control unit 170 of the display device 100 determines a gamma value corresponding to an input frequency using a gamma table (S1601), when the input frequency of an image signal is different from the output frequency of the display panel 180 and the VRR function is turned on.

The gamma table may represent a correspondence relation between the input frequency and the gamma value. The gamma table may be pre-stored in the storage unit 140.

The control unit 170 may extract a gamma value corresponding to the input frequency using the gamma table.

FIG. 17 is a view illustrating a gamma table according to an embodiment of the present disclosure.

In FIG. 17, it is assumed that the output frequency of the display panel 180 is fixed to 120 Hz and the VRR function is turned on.

The control unit 170 may receive information on the input frequency of the image signal from an external device and determine the gamma value corresponding to the input frequency using the gamma table 1700.

Later, the control unit 170 may correct an existing gamma value to the determined gamma value.

For example, when the input frequency is 60 Hz, the control unit 170 may correct 2.1, which is an existing gamma value, to 2.2, which is a gamma value corresponding to 60 Hz.

FIG. 16 will be described again.

In another embodiment, the control unit 170 may determine an offset gain using an offset gain table indicating a correspondence relation between the input frequency and the offset gain.

The offset gain may refer to a gain for adjusting a luminance value for the low grayscale region.

The control unit 170 adjusts an existing gamma value to the determined gamma value (S1603).

Thereafter, the control unit 170 may output the image signal through the display panel 180 based on the adjusted gamma value.

Figure 18:
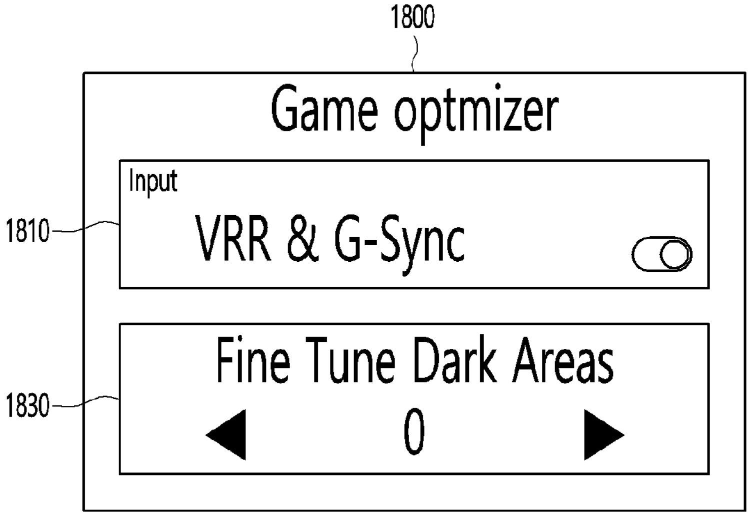
FIG. 18 is a view illustrating a UI menu capable of adjusting a gamma value according to an embodiment of the present disclosure.

FIG. 18 is a view illustrating a UI menu capable of adjusting a gamma value according to an embodiment of the present disclosure.

Referring to FIG. 18, a setting menu 1800 capable of adjusting the VRR and the gamma value (or the offset gain) in a game mode for playing a game video is shown.

The setting menu 1800 may include a VRR menu item 1810 for setting ON or OFF of the VRR function and a gain adjustment item 1830 for adjusting the offset gain.

In particular, even when the gamma value is adjusted according to the input frequency, the user may want to tune the gamma value through the gain adjustment item 1830. In this case, the user may adjust the gamma value for the low grayscale region through user input for the gain adjustment item 1830.

Since characteristics may differ between the display panels 180, the user may perform image quality adjustment through the gain adjustment item 1830.

According to the embodiment of the present disclosure, when the VRR function is turned on, it is possible to improve the black floatation phenomenon as the gamma value for the low grayscale region is adjusted. As the black floatation phenomenon is improved, users may be more immersed in viewing images.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device described above is not limited to the configuration and method of the above-described embodiments, and the above embodiments may be configured by selectively combining all or some of embodiments such that various modifications may be made.

According to the embodiment of the present disclosure, since a black floatation phenomenon is reduced in a low grayscale region, user's immersion in viewing an image may be improved.

In addition, a user can view an image with high image quality through automatic tuning of a gamma value for a low grayscale region, without manually adjusting the gamma value.

What is claimed is:

1. A display device comprising:

a display panel;

an external input interface configured to receive an image signal from an external device; and a controller configured to:

adjust a gamma value based on an input frequency of the image signal when the input frequency of the image signal is less than an output frequency of the display panel and a variable refresh rate (VRR) function of the display device for changing the output frequency according to the input frequency is activated, and output the image signal to the display panel based on the adjusted gamma value, wherein the controller adjusts the gamma value only for a low grayscale region of the image signal having a range of gray levels of 0 to 10 or 0 to 20 among gray levels of 0 to 255.

2. The display device of claim 1, wherein the controller increases the gamma value for the low grayscale region of the image signal.

3. The display device of claim 2, wherein the controller increases the gamma value such that a luminance value for the low grayscale region is reduced.

4. The display device of claim 1, further comprising a storage configured to store a gamma table representing a correspondence relation between the input frequency and the gamma value, wherein the controller extracts the gamma value suiting the input frequency using the gamma table.

5. The display device of claim 1, wherein the controller adjusts an offset gain value for adjusting a luminance value for the low grayscale region to adjust the gamma value.

6. The display device of claim 1, wherein the controller receives information on the input frequency of the image signal from the external device and compares the input frequency with an output frequency of the display panel based on the received information.

7. The display device of claim 1, wherein each pixel configuring the display panel includes an organic light emitting diode (OLED).

8. The display device of claim 1, wherein the gamma value is maintained and not adjusted for remaining regions other than the low grayscale region.

9. A method of operating a display device including a display panel, the method comprising:

receiving an image signal from an external device;

adjusting a gamma value based on an input frequency of the image signal when the input frequency of the image signal is less than an output frequency of the display panel and a variable refresh rate (VRR) function of the display device for changing the output frequency according to the input frequency is activated; and outputting the image signal to the display panel based on the adjusted gamma value, the gamma value is adjusted only for a low grayscale region of the image signal having a range of gray levels of 0 to 10 or 0 to 20 among gray levels of 0 to 255.

10. The method of claim 9, wherein the adjusting the gamma value for the low grayscale region includes increasing the gamma value for the low grayscale region of the image.

11. The method of claim 10, wherein the increasing the gamma value for the low grayscale region of the image signal includes increasing the gamma value such that a luminance value for the low-grayscale region is reduced.

12. The method of claim 9, further comprising:

storing a gamma table representing a correspondence relation between the input frequency and the gamma value, and extracting the gamma value suiting the input frequency using the gamma table.

13. The method of claim 9, wherein the adjusting the gamma value for the low grayscale region includes adjusting an offset gain value for adjusting a luminance value for the low grayscale region to adjust the gamma value.

14. The method of claim 9, further comprising:

receiving information on the input frequency of the image signal from the external device; and comparing the input frequency with an output frequency of the display panel based on the received information.

15. The method of claim 9, wherein the gamma value is maintained and not adjusted for remaining regions other than the low grayscale region.

* * * * *